US010189956B2

(12) United States Patent
Fonnum et al.

(10) Patent No.: US 10,189,956 B2
(45) Date of Patent: Jan. 29, 2019

(54) POLYMER SUBSTRATES FORMED FROM CARBOXY FUNCTIONAL ACRYLAMIDE

(71) Applicants: Life Technologies AS, Carlsbad, CA (US); Life Technologies Corporation, Carlsbad, CA (US)

(72) Inventors: Geir Fonnum, Oslo (NO); Steven M. Menchen, Fremont, CA (US); M. Talha Gokmen, Fjellhamar (NO); Pontus Lundberg, Strømmen (NO); Prasanna Krishnan Thwar, Carlsbad, CA (US); Alfred Lui, Sunnyvale, CA (US); Lily Lu, Foster City, CA (US); Wolfgang Hinz, Carlsbad, CA (US); Lene Husaboe, Strømmen (NO); Elisabeth Breivold, Jessheim (NO); Astrid Evenroed Molteberg, Fetsund (NO); Synne Larsen, Oslo (NO)

(73) Assignees: LIFE TECHNOLOGIES AS, Oslo (NO); LIFE TECHNOLOGIES CORPORATION, Carlsbad, CA (US)

( * ) Notice: Subject to any disclaimer, the term of this patent is extended or adjusted under 35 U.S.C. 154(b) by 0 days.

(21) Appl. No.: 15/871,863

(22) Filed: Jan. 15, 2018

(65) Prior Publication Data
US 2018/0237595 A1 Aug. 23, 2018

Related U.S. Application Data

(62) Division of application No. 15/200,533, filed on Jul. 1, 2016, now Pat. No. 9,868,826.

(60) Provisional application No. 62/188,389, filed on Jul. 2, 2015.

(51) Int. Cl.
| C08F 8/12 | (2006.01) |
| C08J 3/075 | (2006.01) |
| C08F 220/58 | (2006.01) |
| C08F 220/70 | (2006.01) |
| C08F 230/08 | (2006.01) |

(52) U.S. Cl.
CPC .............. *C08J 3/075* (2013.01); *C08F 8/12* (2013.01); *C08F 220/58* (2013.01); *C08F 220/70* (2013.01); *C08F 2230/085* (2013.01); *C08J 2333/26* (2013.01)

(58) Field of Classification Search
CPC ...... C08J 3/075; C08J 2333/26; C08F 220/70; C08F 220/58; C08F 8/12; C08F 2230/085
See application file for complete search history.

(56) References Cited

U.S. PATENT DOCUMENTS

| 4,134,916 A | 1/1979 | Moss et al. |
| 4,451,613 A | 5/1984 | Rousseau et al. |
| 4,507,382 A | 3/1985 | Rousseau et al. |
| 4,507,497 A | 3/1985 | Reilly, Jr. et al. |
| 4,511,646 A | 4/1985 | Forenkamm et al. |
| 4,906,715 A | 3/1990 | Mauz et al. |
| 5,216,096 A | 6/1993 | Hattori et al. |
| 5,455,143 A | 10/1995 | Ali |
| 5,635,574 A | 6/1997 | Aoyagi et al. |
| 5,677,373 A | 10/1997 | Berge et al. |
| 7,217,762 B1 | 5/2007 | Jorgedal et al. |
| 8,574,835 B2 | 11/2013 | Hinz et al. |
| 9,139,665 B2 | 9/2015 | Fonnum et al. |
| 9,139,666 B2 | 9/2015 | Fonnum et al. |
| 9,156,925 B2 | 10/2015 | Fonnum et al. |
| 9,243,085 B2 | 1/2016 | Fonnum et al. |
| 9,487,603 B2 | 11/2016 | Fonnum et al. |
| 9,868,826 B2 | 1/2018 | Fonnum et al. |
| 2004/0215011 A1 | 10/2004 | Deggerdal et al. |
| 2005/0014001 A1 | 1/2005 | Fonnum et al. |
| 2006/0131542 A1 | 6/2006 | Weng et al. |
| 2006/0205905 A1 | 9/2006 | Yoshihiro et al. |
| 2007/0299249 A1 | 12/2007 | Songe |
| 2008/0139399 A1 | 6/2008 | Fonnum et al. |
| 2008/0300383 A1 | 12/2008 | Verdianz et al. |
| 2009/0069554 A1 | 3/2009 | Finne |
| 2009/0127589 A1 | 5/2009 | Rothberg et al. |
| 2009/0280182 A1 | 11/2009 | Beck et al. |
| 2009/0291506 A1 | 11/2009 | Fonnum et al. |
| 2010/0207051 A1 | 8/2010 | Fonnum et al. |
| 2011/0201508 A1 | 8/2011 | Hinz et al. |
| 2013/0210991 A1* | 8/2013 | Fonnum .................. C08F 6/24 524/547 |
| 2013/0211119 A1 | 8/2013 | Kjus et al. |

(Continued)

FOREIGN PATENT DOCUMENTS

| GB | 1441939 | 7/1976 |
| JP | S49-080189 | 8/1974 |
| JP | S60-081229 | 5/1985 |
| JP | H02-166102 | 6/1990 |
| JP | 2007/217447 | 8/2007 |
| JP | 2008-504410 | 2/2008 |
| RU | 2054009 | 2/1996 |
| RU | 2206575 | 6/2003 |
| RU | 2309959 | 11/2007 |
| WO | WO-2011/106542 | 9/2001 |
| WO | WO-2006/000008 | 1/2006 |
| WO | WO-2010/046084 | 4/2010 |

(Continued)

OTHER PUBLICATIONS

Greene, T.W., et al.; Protective Groups in Organic Synthesis, 1998, p. 442-445.*
Deng, K.., et al.; Applied Mechanics and Materials, 2011, p. 1227-1230.*
Sanda, F., et al; Journal of Polymer Science Part A: Polymer Chemistry, 1997, p. 2619-2629.*

(Continued)

*Primary Examiner* — Robert S Jones

(57) ABSTRACT

A polymer substrate, such as a polymer particle, is formed from a carboxyl functional monomer. In an example, the carboxyl functional monomer has a protection group in place of the OH of the carboxyl group. Once the monomer is polymerized, such a protection group can be removed, providing a polymer network with carboxyl functional sites. Such sites can be used to attach other functionality to the polymer substrate.

20 Claims, 2 Drawing Sheets

(56) References Cited

U.S. PATENT DOCUMENTS

2014/0136082 A1    5/2014  Fosaaen
2016/0097094 A1    4/2016  Fonnum et al.

FOREIGN PATENT DOCUMENTS

| WO | WO-2010/125170 | 11/2010 |
| WO | WO-2011/106542 | 9/2011 |
| WO | WO-2013/119936 | 8/2013 |
| WO | WO-2013/119956 | 8/2013 |
| WO | WO-2017/011598 | 1/2017 |

OTHER PUBLICATIONS

Brahim, et al., "Synthesis and Hydration Properties of pH-Sensitive p(HEMA)-Based Hydrogels Containing 3-(Trimethoxysilyll)propyl Methacrylate", *Biomacromolecules*, vol. 4, 2003, 497-503.

Dufour, et al., "A Study of the Hetero Diels-Alder Reaction of N-Alkyl-2-Cyano-1-Azadienes with 2-Vinylindole", *Heterocycles*, vol. 37, No. 3, Oct. 8, 1993, 1455-1458.

Ling, et al., "Polymer-bound cellulose phenylcarbamate derivatives as chiral stationary phases for enantioselective HPLC", *Journal of Separation Science*, vol. 26, Issue 15-16, Oct. 2003, 1337-1346.

PCT/US2013/025328, International Preliminary Report on Patentability, dated Aug. 12, 2014, 1-12.

PCT/US2013/025328, International Search Report and Written Opinion, dated Feb. 10, 2014, 1-19.

PCT/US2013/025328, Partial Search Report, dated Feb. 8, 2013, 1-11.

PCT/US2016/040755, International Preliminary Report on Patentability, dated Jan. 11, 2018, 1-7.

PCT/US2016/040755, International Search Report and Written Opinion, dated Sep. 12, 2016, 1-11.

Peppas, et al., "Hydrogels in Biology and Medicine: From Molecular Principles to Bionanotechnology", *Advanced Materials*, vol. 18, 2006, 1345-1360.

Schumann, et al., "Synthesis and Characterization of Water-Soluble Tin-Based Metallodendrimers", *Organometallics*, vol. 22, No. 10, 2003, pp. 2034-2041.

Skinner, et al., "Effect of Organic Compounds on Reproductive Processes, VI. Alkylating Agents Derived from Various Diamines", *Journal of Medicinal Chemistry*, vol. 10, No. 5, Sep. 1967, 949-950.

\* cited by examiner

POLYMER SUBSTRATES FORMED FROM CARBOXY FUNCTIONAL ACRYLAMIDE

CROSS-REFERENCE TO RELATED APPLICATION(S)

This application is a divisional application of U.S. application Ser. No. 15/200,533, which claims benefit of U.S. Provisional Application No. 62/188,389, filed Feb. 9, 2011, each of which is incorporated herein by reference in its entirety.

FIELD OF THE DISCLOSURE

This disclosure, in general, relates to carboxyl functional acrylamide, polymer substrates formed from such carboxyl functional acrylamide, and methods for forming such polymer substrates.

BACKGROUND

Polymeric particles are increasingly being used as components in separation techniques and to assist with detecting analytes in both chemical and biological systems. For example, polymeric particles have been used in chromatographic techniques to separate target molecules from a solution. In another example, polymeric particles having a magnetic coating are utilized in magnetic separation techniques. More recently, polymeric particles have been used to enhance ELISA-type techniques and can be used to capture polynucleotides.

Many such techniques and uses of particles rely on functionalizing the polymer. However, functionalizing the polymer presents challenges relating to control of the number of sites having the desired functionality and access through the polymer network to the sites to be functionalized.

As such, an improved polymeric particle and method for manufacturing such a polymeric particle would be desirable.

SUMMARY

In an exemplary embodiment, a polymer substrate, such as a polymer particle, is formed from a carboxyl functional monomer. In an example, the carboxyl functional monomer has a protection group in place of the OH of the carboxyl group. Once the monomer is polymerized, such a protection group can be removed, providing a polymer network with carboxyl functional sites. Such sites can be used to attach functionality to the polymer substrate.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
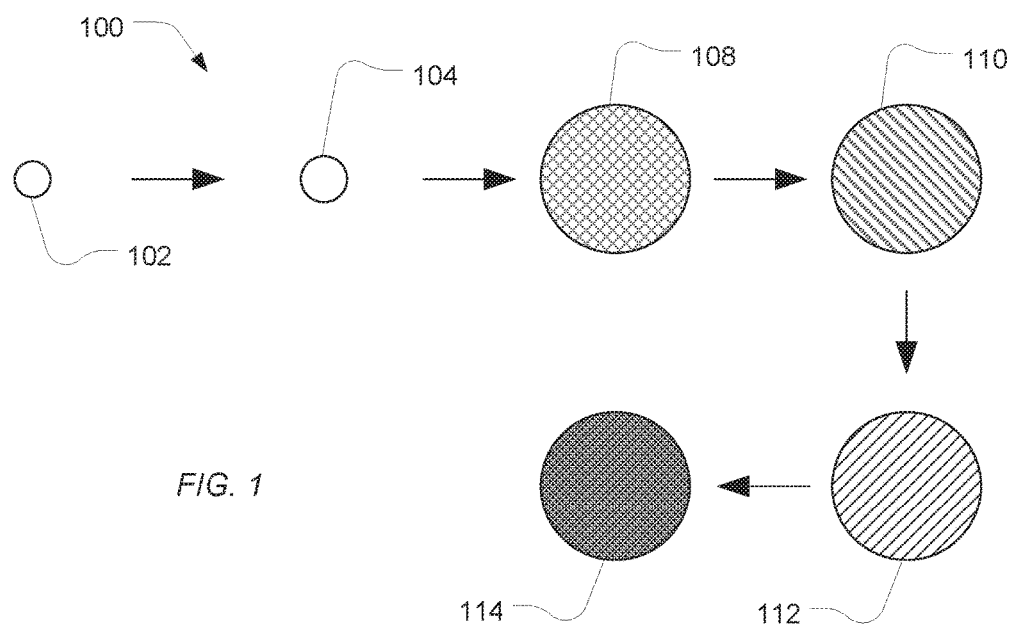
FIG. 1 includes an illustration of an exemplary process flow for manufacturing an exemplary polymeric particle.

In an exemplary embodiment, a polymer substrate, such as a polymer particle, is formed from a carboxyl functional monomer. In an example, the carboxyl functional monomer has a protection group in place of the OH of the carboxyl group. The protection group can protect the OH group during the polymerization reaction or can render the monomer more miscible with hydrophobic phases. Once the monomer is polymerized, the protection group can be removed, providing a polymer network with carboxyl functional sites. Such sites can be used to attach functionality to the polymer substrate, such as oligomer primers.

In a particular example, a monomer solution can be distributed to a dispersed hydrophobic phase within a hydrophilic or aqueous continuous phase. In an example, the dispersed hydrophobic phase can be formed from a hydrophobic polymer bead. The monomer solution can include a protected carboxyl functional monomer, such as a protected carboxyl functional acrylamide. Optionally, the monomer solution can further include other monomers, crosslinkers, porogens, catalysts, or any combination thereof.

In an example, the monomer can include a protected carboxyl functional acrylamide monomer. In particular, the protected carboxyl functional acrylamide includes a protection group protecting the hydrophilic OH of the carboxyl functionality. The protection group can protect the OH group, preventing reaction during polymerization or rendering the monomer more miscible with hydrophobic phases. In particular, the protection group is cleavable from the monomer or from a polymer network formed from the monomer. For example, the protection group can be acid cleavable, in particular, at a pH that does not cause hydrolysis of the polymer network.

For example, the protection group can include a silyl group. In another example, the protection group can include a linear or branched alkyl group having at least three carbons. For example, the alkyl group can include 3 to 8 carbons, such as 3 to 6 carbons or 3 to 5 carbons. In particular, the protection group can be a branched alkyl group, such as a branched alkyl group having between 3 and 5 carbons, such as 4 carbons.

For example, the monomer can have the formula (I):

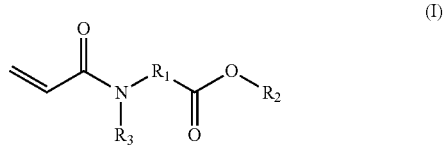

wherein $R_1$ is an alkyl group having between 3 and 10 carbons, is a polyether group having between 1 and 10 ether units, or is another non-ionic polar group, wherein $R_2$ is a linear or branched alkyl group having between 3 and 8 carbons or is a silyl group, and wherein $R_3$ is hydrogen or an alkyl group having between 1 and 6 carbons. In a particular example, $R_1$ is an alkyl group having between 3 and 10 carbons or is a polyether group having between 1 and 10 ether units. For example, $R_1$ can be an alkyl group having 3 to 6 carbons, such as 3 to 5 carbons. In another example, $R_1$ can be a polyether group including units, such as including ethylene oxide or propylene oxide units, in a range of 2 to 6 units, such as 2 to 4 units. In a further example, $R_1$ can be a non-ionic polar group, for example, including an amide. In an example, $R_2$ is a branched alkyl group, for example, having 3 to 5 carbons, such as 4 carbons. In particular, $R_2$ can be an isopropyl, isobutyl, sec-butyl, or tert-butyl group, or any combination thereof. The silyl group can be a trialkyl silyl group, an organo disilyl group, or an organo trisilyl group. For example, the trialkyl silyl group can be a trimethyl silyl or a triethyl silyl group. In a further example, $R_3$ is hydrogen. In another example, $R_3$ is a methyl or ethyl group.

In an example, the monomer can have the formula (II):

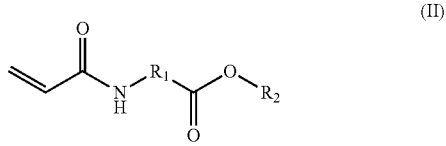

(II)

wherein $R_1$ is an alkyl group having between 3 and 10 carbons or is a polyether group having between 1 and 10 ether units, and wherein $R_2$ is a linear or branched alkyl group having between 3 and 8 carbons or is a silyl group. For example, $R_1$ can be an alkyl group having 3 to 6 carbons, such as 3 to 5 carbons. In another example, $R_1$ can be a polyether group including units, such as including ethylene oxide or propylene oxide units, in a range of 2 to 6 units, such as 2 to 4 units. In an example, $R_2$ is a branched alkyl group, for example, having 3 to 5 carbons, such as 4 carbons. In particular, $R_2$ can be an isopropyl, isobutyl, sec-butyl, or tert-butyl group, or any combination thereof. The silyl group can be a trialkyl silyl group, an organo disilyl group, or an organo trisilyl group. For example, the trialkyl silyl group can be a trimethyl silyl or a triethyl silyl group.

In a particular example, the protected carboxyl functional monomer can be acrylamidobutanoate protected with a tert-butyl protection group and having the formula (III):

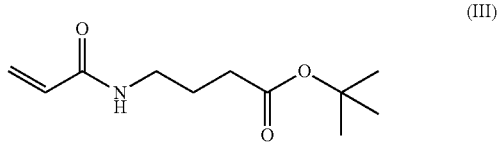

(III)

In an example, the protected carboxyl functional monomers of formulas (I), (II), or (III) can be formed by reacting a protected amino alkanoic acid hydrochloride, such as an amino alkanoic alkyl ester hydrocholoride, with acryloyl chloride. For example, stoichiometric quantities of an amino alkanoic alkyl ester hydrocholoride, such as aminobutyric acid t-butyl ester hydrochloride, in a dichloromethane solvent can be mixed with a potassium carbonate solution in water at a temperature in a range of −10° C. to 10° C., such as −5° C. to 5° C. An acryloyl chloride solution can be added and the mixture stirred under the same thermal conditions. The mixture can be extracted with a solvent, such as dichloromethane. The solvent can be removed under reduced pressure or vacuum.

In an example, the monomer described above can be polymerized to form a polymer substrate. For example, the polymer substrate can be a polymer coating or film. In another example, the polymer substrate can be a polymer particle or bead. For example, a polymer particle can be formed using emulsion polymerization or can be formed in a dispersed hydrophobic phase within a hydrophilic continuous phase.

For example, as illustrated in FIG. 1, a method 100 for forming a polymer particle includes providing a seed particle 102, which is promoted to form a dispersed phase 104.

A protected monomer or monomers are added to the suspension and preferably reside in the dispersed phase 104 formed from a promoted seed particle. The monomer or monomers and optionally a crosslinker are polymerized to form a polymeric particle 108. The polymeric particle 108 can be stripped of the seed polymer from the seed particle to form the polymeric particle 110. The protection groups on the polymeric particle 110 are removed to form a hydrophilic particle 112. The hydrophilic particle 112 can be activated to form a conjugated particle 114.

The seed particle 102 can include a seed polymer. In an example, the seed polymer is hydrophobic. In particular, the seed polymer can include a styrenic polymer, an acrylic polymer, an acrylamide, another hydrophobic vinyl polymer, or any combination thereof. In an example, the seed particle 102 is monodisperse, for example, having a coefficient of variance of not greater than 20%. Coefficient of variance (CV) is defined as 100 times the standard deviation divided by the average, where "average" is mean particle diameter and standard deviation is standard deviation in particle size. Alternatively, the "average" can be either the z-average or mode particle diameter. In accordance with usual practice, CV is calculated on the main mode, i.e. the main peak, thereby excluding minor peaks relating to aggregates. Thus some particles below or above mode size may be discounted in the calculation which may, for example, be based on about 90% of total particle number of detectable particles. Such a determination of CV is performable on a CPS disc centrifuge. In particular, a population of seed particles 102 can have a coefficient of variance of not greater than 10%, such as not greater than 5.0%, not greater than 3.5%, not greater than 3%, not greater than 2.5%, not greater than 2%, or even not greater than 1.0%. Further, the seed particle 102 can have an initial particle size of not greater than 0.6 µm. For example, the initial particle size can be not greater than 0.45 µm, such as not greater than 0.35 µm, or even not greater than 0.15 µm, but at least 0.001 µm. Alternatively, larger seed particles having an initial particle size of at least 3 µm, such as at least 5 µm, at least 10 µm, at least 20 µm, or at least 50 µm, can be used to form larger polymeric particles. In an example, the initial particle size may be not greater than 100 µm.

The seed particle 102 can be promoted within an aqueous suspension to form a promoted dispersed phase 104. In particular, promoting the seed particles includes mixing a solvent and a promoter with the seed particle within the aqueous suspension to form the dispersed phase. Promoted seed particles more readily absorb hydrophobic components. The solvent can be water-miscible. For example, the solvent can include an aldehyde or ketone, such as formaldehyde, acetone, methyl ethyl ketone, diisopropyl ketone, dimethyl formamide, or combinations thereof; an ether solvent, such as tetrahydrofuran, dimethyl ether, or combinations thereof; an ester solvent; a heterocyclic solvent, such as pyridine, dioxane, tetrahydrofurfuryl alcohol, N-methyl-2-pyrrolidone, or combinations thereof; or combinations thereof. In an example, the solvent can include a ketone, such as acetone. In another example, the solvent can include an ether solvent, such as tetrahydrofuran. In an additional example, the solvent can include a heterocyclic solvent, such as pyridine.

The promoter or promoting agent can be hydrophobic and have a low water solubility, such as a water solubility of not greater than 0.01 g/l at 25° C. For example, the promoter can include dioctanoyl peroxide, dioctyladipate, n-butyl phthalate, dodecanol, polystyrene with molecular weight below 20 kD, or a combination thereof. In an example, the dioctanoyl peroxide can also perform as an initiator for a polymerization reaction. The promoter can also be a low molecular weight polystyrene, for example, made in a separate polymerization step using a low monomer/initiator ratio or the addition of chain transfer reagents during the seed polymerization. The promoter is typically emulsified in a high pressure homogenizer.

The aqueous suspension can also include a surfactant. The surfactant can be an ionic surfactant, an amphoteric surfactant, or a non-ionic surfactant. The ionic surfactant can be an anionic surfactant. In another example, the ionic surfactant can be a cationic surfactant. An exemplary anionic surfactant includes a sulfate surfactant, a sulfonate surfactant, a phosphate surfactant, a carboxylate surfactant, or any combination thereof. An exemplary sulfate surfactant includes alkyl sulfates, such as ammonium lauryl sulfate, sodium lauryl sulfate (sodium dodecyl sulfate, (SDS)), or a combination thereof; an alkyl ether sulfate, such as sodium laureth sulfate, sodium myreth sulfate, or any combination thereof; or any combination thereof. An exemplary sulfonate surfactant includes an alkyl sulfonate, such as sodium dodecyl sulfonate; docusates such as dioctyl sodium sulfosuccinate; alkyl benzyl sulfonate; or any combination thereof. An exemplary phosphate surfactant includes alkyl aryl ether phosphate, alkyl ether phosphate, or any combination thereof. An exemplary carboxylic acid surfactant includes alkyl carboxylates, such as fatty acid salts or sodium stearate; sodium lauroyl sarcosinate; a bile acid salt, such as sodium deoxycholate; or any combination thereof.

An exemplary cationic surfactant includes primary, secondary or tertiary amines, quaternary ammonium surfactants, or any combination thereof. An exemplary quaternary ammonium surfactant includes alkyltrimethylammonium salts such as cetyl trimethylammonium bromide (CTAB) or cetyl trimethylammonium chloride (CTAC); cetylpyridinium chloride (CPC); polyethoxylated tallow amine (POEA); benzalkonium chloride (BAC); benzethonium chloride (BZT); 5-bromo-5-nitro-1,3-dioxane; dimethyldioctadecylammonium chloride; dioctadecyldimethylammonium bromide (DODAB); or any combination thereof.

An exemplary amphoteric surfactant includes a primary, secondary, or tertiary amine or a quaternary ammonium cation with a sulfonate, carboxylate, or phosphate anion. An exemplary sulfonate amphoteric surfactant includes (3-[(3-cholamidopropyl)dimethylammonio]-1-propanesulfonate); a sultaine such as cocamidopropyl hydroxysultaine; or any combination thereof. An exemplary carboxylic acid amphoteric surfactant includes amino acids, imino acids, betaines such as cocamidopropyl betaine, or any combination thereof. An exemplary phosphate amphoteric surfactant includes lecithin. In a further example, the surfactant can be a non-ionic surfactant such as a polyethylene glycol-based surfactant.

Returning to FIG. 1, a monomer or monomers added to suspension preferably naturally reside in the dispersed phase 104 formed from the promoted seed particle. A crosslinker, such as a hydrophobic crosslinker can also be added to the aqueous suspension and preferentially can reside in the dispersed phase. In an example, the crosslinker has a water solubility of not greater than 10 g/l. Further, a porogen can be added to the aqueous suspension and preferentially can reside within the dispersed phase. In a further example, the dispersed phase can include acrydite oligonucleotides, such as an ion-exchanged acrydite oligonucleotide. As illustrated in FIG. 1, the monomer and optionally, the crosslinker are polymerized to form a polymeric particle 108.

The monomer can include a protected carboxyl functional acrylamide, as described above. In addition to the protected carboxyl functional monomer, one or more comonomers can be included to preferentially reside in the dispersed phase 104 and polymerize with the protected carboxyl functional monomer. The comonomer can be a radically polymerizable comonomer such as a vinyl-based comonomer. In particular, the comonomer can include a hydrophilic monomer coupled to a hydrophobic protection group. In an example, the hydrophilic comonomer can include acrylamide, vinyl acetate, hydroxyalkylmethacrylate, or any combination thereof. In a particular example, the hydrophilic comonomer is an acrylamide, such as an acrylamide including hydroxyl groups, amino groups, carboxyl groups, or a combination thereof. In an example, the hydrophilic comonomer is an aminoalkyl acrylamide, an acrylamide functionalized with an amine terminated polypropylene glycol (VI, illustrated below), an acrylopiperazine (VII, illustrated below), or a combination thereof. In another example, the acrylamide comonomer can be a hydroxyalkyl acrylamide, such as hydroxyethyl acrylamide. In particular, the hydroxyalkyl acrylamide can include N-tris(hydroxymethyl)methyl)acrylamide (IV, illustrated below), N-(hydroxymethyl)acrylamide (V, illustrated below), or a combination thereof.

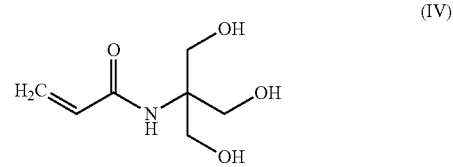

(IV)

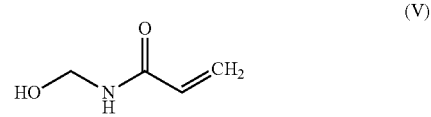

(V)

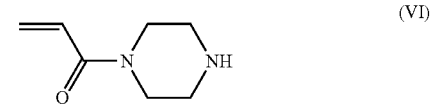

(VI)

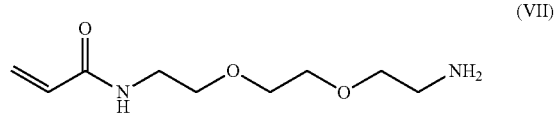

(VII)

In a particular example, the hydrophilic comonomer includes hydroxyl groups or includes amines A hydrophobic protection group shields the hydrophilicity of the comonomer, for example, by bonding to a hydroxyl group or an amine group. Such protection groups are referred to herein as hydroxyl or hydroxy protection groups when bonding to a hydroxyl group. In particular, the hydrophobic protection group is removable, such as through cleaving, for example, acid cleaving. The hydrophobic group can be selected to cleave under acidic conditions that do not result in the hydrolysis of the underlying polymer or portions thereof. For example, for pH values lower than 6, when an acrylamide polymer is present, the hydrophobic protection group cleaves at a pH higher than a pH at which the amide portion of the acrylamide hydrolyzes. For pH values higher than 9, the hydrophobic protection group cleaves at a pH lower than a pH at which the amide portion of the acrylamide hydrolyzes.

An exemplary hydrophobic protection group includes an organometallic moiety. For example, the organometallic moiety can form a silyl ether functional group. The silyl ether functional group can be derived from a halogenated silyl compound, such as a compound of the general formulation $R_1Si(R_2)(R_3)(R_4)$, wherein $R_1$ is a halogen, such as chlorine and $R_2$, $R_3$, and $R_4$ are independently selected from hydrogen, alkyl groups such as methyl, ethyl, propyl, butyl, aryl group, silyl groups, ether derivatives thereof, or any combination thereof. An exemplary silyl ether functional group is derived from tert-butyldimethylsilyl chloride, trimethylsilyl chloride, triethylsilyl chloride, tripropylsilyl chloride, tributylsilyl chloride, diphenyl methyl silyl chloride, chloro(dimethyl)phenyl silane, or a combination thereof. In a particular example, the protected monomer includes N-(2-((tert-butyldimethylsilyl)oxy)ethyl)acrylamide or tBDMS-HEAM, N-(2-((triethylsilyl)oxy)ethyl)acrylamide or TES-HEAM, or a combination thereof. In another example, the hydrophobic protection group can include an organic moiety. An exemplary organic moiety can include an alkyloxycarbonyl group moiety, such as t-butyloxycarbonyl, fluorenylmethyloxycarbonyl, or a combination thereof. In an example, such an organic moiety can be a hydrophobic protection group bound to an amine functional group, such as an amine functional group of an amine functionalized acrylamide or copolymer thereof.

In a further example, a mixture of the carboxyl functional monomer and a comonomer, such as a mixture of carboxyl functional acrylamide monomer and hydroxyalkyl acrylamide comonomer or a mixture of carboxyl functional acrylamide monomer and amine functionalized acrylamide comonomer, can be used. In an example, the carboxyl functional acrylamide monomer can be included in a ratio relative to hydroxyalkyl acrylamide or amine functionalized acrylamide comonomer in a range of 2:1 to 1:1000, such as a range of 1:1 to 1:500, a range of 1:2 to 1:500, a range of 1:5 to 1:500 or even a range of 1:10 to 1:200.

The protected monomer and comonomer (together "protected monomers") can be included in an amount relative to the initial seed polymer, expressed as a ratio of weights (protected monomers: seed polymer), in a range of 500:1 to 1:2, such as a range of 200:1 to 1:1, a range of 100:1 to 5:1, a range of 90:1 to 10:1, or even a range of 80:1 to 30:1. Alternatively, the protected monomers can be included in an amount in a range of 10:1 to 1:2, such as a range of 5:1 to 1:2, or even a range of 2:1 to 1:2.

The dispersed phase can also include a crosslinker. In an example, the crosslinker is included in a mass ratio of protected monomer to crosslinker in a range of 15:1 to 1:2, such as a range of 10:1 to 1:1, a range of 6:1 to 1:1, or even a range of 4:1 to 1:1. The crosslinker can have a low water solubility (e.g., less than 10 g/l), resulting in a preference for the dispersed phase. In particular, the crosslinker can be a divinyl crosslinker. For example, a divinyl crosslinker can include a diacrylamide, such as N,N'-(ethane-1,2-diyl)bis(2-hydroxyethyl)acrylamide, N,N'-(2-hydroxypropane-1,3-diyediacrylamide, or a combination thereof. In another example, a divinyl crosslinker includes ethyleneglycol dimethacrylate, divinylbenzene, hexamethylene bisacrylamide, trimethylolpropane trimethacrylate, a protected derivative thereof, or a combination thereof. In a further example, the crosslinker can be protected with a hydrophobic protection group, such as a hydroxyl protection group. In particular, the hydrophobic protection group can be an organometallic moiety. For example, the organometallic moiety can form a silyl ether functional group. An exemplary silyl ether functional group can be derived from tert-butyldimethylsilyl chloride, trimethylsilyl chloride, triethylsilyl chloride, tripropylsilyl chloride, tributylsilyl chloride, diphenyl methyl silyl chloride, chloro(dimethyl)phenylsilane, or a combination thereof. An exemplary protected diacrylamide crosslinker includes N,N'-(ethane-1,2-diyl)bis(N-(2-((tert-butyldimethylsilyl)oxy)ethyl)acrylamide, N,N'-(N-(2-((tert-butyldimethylsilyl)oxy)propane-1,3-diyediacrylamide, N,N'-(ethane-1,2-diyl)bis(N-(2-((triethylsilyl)oxy)ethyl)acrylamide, N,N'-(N-(2-((triethylsilyl)oxy)propane-1,3-diyl)diacrylamide, silyl-protected N-[2-(acryloylamino)-1, 2-dihydroxyethyl]acrylamide such as N,N'(2,3-bis((triethylsilyl)oxy)butane-1,4-diyl)diacrylamide, or a combination thereof. In another example, the protection group can include an alkyloxycarbonyl group moiety, such as t-butyloxycarbonyl, fluorenylmethyloxycarbonyl, or a combination thereof. In particular, a crosslinker including a hydroxyl group can be protected with a protection group, such as those described above in relation to the protected monomer.

In addition, polymerizing the hydrophilic monomer having a hydrophobic protection can include polymerizing in the presence of a porogen. An exemplary porogen includes an aromatic porogen. In example, the aromatic porogen includes benzene, toluene, xylene, mesitylene, phenethylacetate, diethyladipate, hexylacetate, ethylbenzoate, phenylacetate, butylacetate, or a combination thereof. The porogen typically has a Solubility parameter of 15-20. In another example, the porogen is an alkanol porogen, such as dodecanol. The porogen can be included in amounts relative to the organic phase within the reactive system in a range of 1 wt % to 99 wt %, such as a range of 30 wt % to 90 wt % or even a range of 50 wt % to 85 wt %.

Optionally, a polymerization initiator can be included. An exemplary polymerization initiator can initiate polymerization through free radical generation. An exemplary polymerization initiator includes an azo initiator, such as oil soluble azo initiators. Another initiator can include ammonium persulfate. A further exemplary initiator can include tetramethylethylenediamine In an example, the polymerization initiator can be included in an amount of 0.001 wt % to 3 wt % based on the weight of the dispersed phase.

Following polymerization, the polymeric particle 108 can be stripped of the seed polymer to form the polymeric particle 110 still having the hydrophobic protection groups. For example, the seed polymer can be extracted using a solvent, such as an aldehyde or ketone, such as acetone, methyl ethyl ketone, diisopropyl ketone, butylacetate, cyclohexanone, dimethyl formamide, or a combination thereof; a phthalate solvent, such as, n-butyl phthalate; an ether solvent, such as tetrahydrofuran, diisopropyl ether, methyl tertbutyl ether, dimethyl ether, diethyl ether, or a combination thereof; an ester solvent, such as ethyl acetate, butyl acetate, or a combination thereof; a heterocyclic solvent, such as pyridine, dioxane, tetrahydrofurfuryl alcohol, or a combination thereof; halogenated solvents, such as dichloro methane, chloroform or a combination thereof; or a combination thereof. Alternatively, the seed polymer can be extracted following the conversion of the polymeric particle to a hydrophilic particle. For example, the seed polymer can be extracted following deprotecting the polymer of particle, such as removing the silyl groups on the polymer resulting from the protected monomer.

As illustrated in FIG. 1, the polymeric particle 110, once the seed polymer is extracted, can be converted to a hydrophilic polymeric particle by removing at least a portion of the hydrophobic protection groups. For example, the hydrophobic protection groups can be acid-cleaved from the polymeric particles. In particular, such removing can remove substantially all of the hydrophobic protection groups from the polymeric particle, such as removing at least 80% of the hydrophobic protection groups, or even at least 90% of the hydrophobic protection groups.

In an example, the hydrophobic protection groups are acid-cleaved through the addition of an acid, such as an organic acid. In particular, the organic acid can have a pKa in a range of 3.0 to 5.5. For example, the organic acid can include acetic acid, lactic acid, citric acid, or any combination thereof. Alternatively, inorganic acids can be used. For example, a sulfuric acid solution can be used.

Once at least a portion of the hydrophobic protection groups is removed, a hydrophilic particle 112 is formed. The hydrophilic particle includes carboxyl functionality. In an example, the hydrophilic particle 112 can be a hydrogel particle including a hydrogel polymer. A hydrogel is a polymer that can absorb at least 20% of its weight in water, such as at least 45%, at least 65%, at least 85%, at least 100%, at least 300%, at least 1000%, at least 1500%, or even at least 2000% of its weight in water, but not greater than $10^6$%.

Prior to converting to a hydrophilic particle, the particles can have a positive log(p) value. Following conversion, the particles can have a negative log(p) value. The converted particles can preferentially reside in aqueous or hydrophilic phases relative to hydrophobic phases.

The hydrophilic polymer 112 can be activated to facilitate conjugation with a target analyte, such as a polynucleotide. For example, functional groups on the hydrophilic particle 112 can be enhanced to permit binding with target analytes or analyte receptors. In a particular example, functional groups of the hydrophilic polymer can be modified with reagents capable of converting the hydrophilic polymer functional groups to reactive moieties that can undergo nucleophilic or electrophilic substitution.

In particular, the hydrophilic polymer 112 has carboxyl functionality that can be activated to facilitate conjugation, for example to biomolecules, such as nucleic acids. In an exemplary embodiment, the hydrophilic polymer includes a polyacrylamide polymer network having alkanoic acid moieties or ester derivatives thereof, which can react with succinimidyl compounds, such as a succinimidyl uronium compound or a succinimidyl phosphonium compound, to provide succinimidyl alkanoate moieties on the polyacrylamide network Amine-terminated nucleic acids, such as amine-terminated oligonucleotides, can react with the succinimidyl alkanoate moieties to capture the nucleic acid to the polymer network through an alkylamide moiety.

For example, a bead substrate can be formed of a polyacrylamide polymer network that is functionalized with an alkanoic acid moiety or an ester derivative thereof. In particular, the polyacrylamide polymer network can be formed from copolymerization of acrylamide monomers having carboxyl moieties or ester derivatives thereof and acrylamide monomers having hydroxyl or amine moieties. The ratio of the carboxyl functional monomer to the acrylamide monomer including hydroxyl or amine moieties influences the availability of conjugation sites that are reactive to succinimidyl compounds, such as succinimidyl uronium or succinimidyl phosphonium. When conjugated with amine-terminated biomolecules, such as an amine-terminated nucleic acid (e.g., an amine-terminated oligonucleotide), the polymeric bead can include a polyacrylamide polymer network having alkylamide moieties directly linked to nitrogen of the amide moiety on the acrylamide backbone of the polyacrylamide network and linked to the biomolecule, such as the nucleic acid.

The succinimidyl compound, for example, can be a succinimidyl uronium compound or a succinimidyl phosphonium compound. In a particular example, the succinimidyl compound is a succinimidyl uronium compound. The succinimidyl uronium compound can be an O-type succinimidyl uronium or an N-type succinimidyl uronium. In particular, the succinimidyl uronium is an O-type succinimidyl uronium. In an example, the O-type succinimidyl uronium is an N-hydroxy succinimidyl uronium. In another example, the succinimidyl compound is a succinimidyl phosphonium compound.

In embodiments formed with a comonomer including hydroxyl groups, hydroxyl groups on the hydrophilic particle 112 can be activated by replacing at least a portion of the hydroxyl groups with a sulfonate group or chlorine. Exemplary sulfonate groups can be derived from tresyl, mesyl, tosyl, or fosyl chloride, or any combination thereof. Sulfonate can act to permit nucleophiles to replace the sulfonate. The sulfonate may further react with liberated chlorine to provide chlorinated groups that can be used in a process to conjugate the particles. In another example, amine groups on the hydrophilic polymer 112 can be activated.

For example, target analyte or analyte receptors can bind to the hydrophilic polymer through nucleophilic substitution with the sulfonate group. In particular example, target analyte receptors terminated with a nucleophile, such as an amine or a thiol, can undergo nucleophilic substitution to replace the sulfonate groups on the surface of the hydrophilic polymer 112. As a result of the activation, a conjugated particle 114 can be formed.

In another example, the sulfonated particles can be further reacted with mono- or multi-functional mono- or multi-nucleophilic reagents that can form an attachment to the particle while maintaining nucleophilic activity for oligonucleotides comprising electrophilic groups, such as maleimide. In addition, the residual nucleophilic activity can be converted to electrophilic activity by attachment to reagents comprising multi- electrophilic groups, which are subsequently to attach to oligonucleotides comprising nucleophilic groups.

In another example, a monomer containing the functional group can be added during the polymerization. The monomer can include, for example, an acrylamide containing a carboxylic acid, ester, halogen or other amine reactive group. The ester group may be hydrolyzed before the reaction with an amine oligonucleotide.

Other conjugation techniques include the use of monomers that comprise hydrophobic protecting groups on amines during particle synthesis. De-protection of the amine group makes available a nucleophilic group that can be further modified with amine reactive bi-functional bis-electrophilic reagents that yield a mono-functional electrophilic group subsequent to attachment to the polymer particle. Such an electrophilic group can be reacted with oligonucleotides having a nucleophilic group, such as an amine or thiol, causing attachment of the oligonucleotide by reaction with the vacant electrophile.

In another example incorporating amino functional comonomers in the particle 112, nucleophilic amino groups can be modified with di-functional bis-electrophilic moieties, such as a di-isocyanate or bis-NHS ester, resulting in a hydrophilic particle reactive to nucleophiles. An exemplary bis-NHS ester includes bis-succinimidyl C2-C12 alkyl esters, such as bis-succinimidyl suberate or bis-succinimidyl glutarate.

Other activation chemistries include incorporating multiple steps to convert a specified functional group to accommodate specific desired linkages. For example, the sulfonate modified hydroxyl group can be converted into a nucleophilic group through several methods. In an example, reaction of the sulfonate with azide anion yields an azide substituted hydrophilic polymer. The azide can be used directly to conjugate to an acetylene substituted biomolecule via "CLICK" chemistry that can be performed with or without copper catalysis. Optionally, the azide can be converted to amine by, for example, catalytic reduction with hydrogen or reduction with an organic phosphine. The resulting amine can then be converted to an electrophilic group with a variety of reagents, such as di-isocyanates, bis-NHS esters, cyanuric chloride, or a combination thereof. In an example, using di-isocyanates yields a urea linkage between the polymer and a linker that results in a residual isocyanate group that is capable of reacting with an amino substituted biomolecule to yield a urea linkage between the linker and the biomolecule. In another example, using bis-NHS esters yields an amide linkage between the polymer and the linker and a residual NHS ester group that is capable of reacting with an amino substituted biomolecule to yield an amide linkage between the linker and the biomolecule. In a further example, using cyanuric chloride yields an amino-triazine linkage between the polymer and the linker and two residual chloro-triazine groups one of which is capable of reacting with an amino substituted biomolecule to yield an amino-triazine linkage between the linker and the biomolecule. Other nucleophilic groups can be incorporated into the particle via sulfonate activation. For example, reaction of sulfonated particles with thiobenzoic acid anion and hydrolysis of the consequent thiobenzoate incorporates a thiol into the particle which can be subsequently reacted with a maleimide substituted biomolecule to yield a thio-succinimide linkage to the biomolecule. Thiol can also be reacted with a bromo-acetyl group.

Alternatively, acrydite oligonucleotides can be used during the polymerization to incorporate oligonucleotides. An exemplary acrydite oligonucleotide can include an ion-exchanged oligonucleotides.

Covalent linkages of biomolecules onto refractory or polymeric substrates can be created using electrophilic moieties on the substrate coupled with nucleophilic moieties on the biomolecule or nucleophilic linkages on the substrate coupled with electrophilic linkages on the biomolecule. Because of the hydrophilic nature of most common biomolecules of interest, the solvent of choice for these couplings is water or water containing some water soluble organic solvent in order to disperse the biomolecule onto the substrate. In particular, polynucleotides are generally coupled to substrates in water systems because of their poly-anionic nature. Because water competes with the nucleophile for the electrophile by hydrolyzing the electrophile to an inactive moiety for conjugation, aqueous systems generally result in low yields of coupled product, where the yield is based on the electrophilic portion of the couple. When high yields of electrophilic portion of the reaction couple are desired, high concentrations of the nucleophile are required to drive the reaction and mitigate hydrolysis, resulting in inefficient use of the nucleophile. In the case of polynucleic acids, the metal counter ion of the phosphate can be replaced with a lipophilic counter-ion, in order to help solubilize the biomolecule in polar, non-reactive, non-aqueous solvents. These solvents can include amides or ureas such as formamide, N,N-dimethylformamide, acetamide, N,N-dimethylacetamide, hexamethylphosphoramide, pyrrolidone, N-methylpyrrolidone, N,N,N',N'-tetramethylurea, N,N'-dimethyl-N,N'-trimethyleneurea, or a combination thereof; carbonates such as dimethyl carbonate, propylene carbonate, or a combination thereof; ethers such as tetrahydrofuran; sulfoxides and sulfones such as dimethylsulfoxide, dimethylsulfone, or a combination thereof; hindered alcohols such as tert-butyl alcohol; or a combination thereof. Lipophilic cations can include tetraalkylammomiun or tetraarylammonium cations such as tetramethylamonium, tetraethylamonium, tetrapropylamonium, tetrabutylamonium, tetrapentylamonium, tetrahexylamonium, tetraheptylamonium, tetraoctylamonium, and alkyl and aryl mixtures thereof, tetraarylphosphonium cations such as tetraphenylphosphonium, tetraalkylarsonium or tetraarylarsonium such as tetraphenylarsonium, and trialkylsulfonium cations such as trimethylsulfonium, or a combination thereof. The conversion of polynucleic acids into organic solvent soluble materials by exchanging metal cations with lipophilic cations can be performed by a variety of standard cation exchange techniques.

In another example, particles can be formed using an emulsion polymerization technique in which a hydrophobic phase forms a dispersed phase within a hydrophilic phase. The monomers, crosslinkers, and other agents and compounds described above that favor hydrophobic phases tend to reside in the hydrophobic phase in which polymerization occurs.

Surfactants, such as those described above can be used in the hydrophilic phase to support emulsion formation. When a seed particle is used, the surfactant can be used at a concentration below the critical micelle concentration. Alternatively, the surfactant can be used at a concentration greater than the critical micelle concentration. Emulsion polymerization is typically performed with a water soluble initiator like potassium or ammonium persulfate.

In particular, the above method can produce a plurality of particles having desirable particle size and coefficient of variance. The set of particles can include, for example, 100,000 particles, such as 500,000 particles, greater than 1 million particles, greater than 10 million particles, or even at least $1 \times 10^{10}$, but can include not greater than $1 \times 10^{20}$ particles. Particles of the plurality of particles may be hydrophilic polymeric particles, such as hydrogel particles. In a particular example, the hydrogel particle can be an acrylamide particle, such as a particle including a crosslinked carboxyl functional acrylamide polymer or a crosslinked copolymer of carboxyl functional acrylamide and one or both of hydroxyalkyl acrylamide or amine functionalized acrylamide.

The plurality of particles can have a desirable particle size, such as a particle size not greater than 100 μm, not greater than 30 μm, or not greater than 3 μm. The average particle size is the mean particle diameter. For example, the average particle size may be not greater than 2 μm, such as not greater than 1.5 μm, not greater than 1.1 μm, not greater than 0.8 μm, not greater than 0.6 μm, not greater than 0.5 μm, or even not greater than 0.3 μm, but generally at least 0.01 μm, such as at least 0.1 μm. In a particular example, the average particle size can be in a range of 0.1 μm to 100 μm, such as a range of 0.1 μm to 50 μm or a range of 0.1 μm to 1.1 μm. In some aspects, the above described method provides technical advantages for production of particles having a particle size in a range of 5 μm to 100 μm, such as a range of 20 μm to 100 μm, or a range of 30 μm to 70 μm. In other aspects, the above described method provides technical advantages for the production of particles having a particle size of not greater than 1.1 μm. When the seed is larger, larger particles can be formed. The size of the particles can be adjusted based on the size of the seed particle. Using the present method, the size of the polymeric particle is less dependent on surfactant selection and concentration than when other methods are used.

Further, the plurality of particles can be monodisperse and may have a desirably low coefficient of variance, such as a coefficient of variance of not greater than 20%. As above, the coefficient of variance (CV) is defined as 100 times the standard deviation divided by average, where "average" is the mean particle diameter and standard deviation is the standard deviation in particle size. The "average" alternatively can be either the z-average or mode particle diameter. In accordance with usual practice, CV is calculated on the main mode, i.e., the main peak, thereby excluding minor peaks relating to aggregates. Thus, some particles below or above mode size may be discounted in the calculation which may, for example, be based on about 90% of total particle number of detectable particles. Such a determination of CV is performable on a CPS disc centrifuge or a coulter counter. For example, the coefficient of variance (CV) of the plurality of particles may be not greater than 15%, such as not greater than 10%, not greater than 5%, not greater than 4.5%, not greater than 4.0%, not greater than 3.5%, or even not greater than 3.0%. Such CV can be accomplished without filtering or other size exclusion techniques.

In a further example, a hydrophilic polymeric particle in water can be not greater than 50 wt % polymer, such as not greater than 30wt % polymer, not greater than 20 wt % polymer, not greater than 10 wt % polymer, not greater than 5 wt % polymer, or even not greater than 2 wt % polymer.

In an additional example, the polymeric particle can have a porosity permitting diffusion of proteins and enzymes. In an example, the polymeric particles can have a porosity to permit diffusion of proteins having a size of at least 50 kilodaltons, such as at least 100 kilodaltons, at least 200 kilodaltons, at least 250 kilodaltons, or even at least 350 kilodaltons. In a particular example, the diffusion is limited for proteins having a $10^5$ kilodalton size.

In another example, when conjugated, the polymeric particle can include a density of polynucleotides, termed nucleotide density, of at least $7 \times 10^4$ per $\mu m^3$. For example, the nucleotide density can be at least $10^5$ per $\mu m^3$, such as at least $10^6$ per $\mu m^3$, at least $5 \times 10^6$ per $\mu m^3$, at least $8 \times 10^6$ per $\mu m^3$, at least $1 \times 10^7$ per $\mu m^3$, or even at least $3 \times 10^7$ per $\mu m^3$. In a further example, the nucleotide density can be not greater than $10^{15}$ per $\mu m^3$.

Such polymeric particles can be used in a variety of separations techniques and analytic techniques. In particular, the polymeric particles may be useful in binding polynucleotides. Such binding polynucleotides may be useful in separating polynucleotides from solution or can be used for analytic techniques, such as sequencing. In a particular example illustrated in FIG. 2, such polymeric particles can be used as a support for polynucleotides during sequencing techniques. For example, such hydrophilic particles can immobilize a polynucleotide for sequencing using fluorescent sequencing techniques. In another example, the hydrophilic particles can immobilize a plurality of copies of a polynucleotide for sequencing using ion-sensing techniques.

In general, the polymeric particle can be treated to include a biomolecule, including nucleosides, nucleotides, nucleic acids (oligonucleotides and polynucleotides), polypeptides, saccharides, polysaccharides, lipids, or derivatives or analogs thereof. For example, a polymeric particle can bind or attach to a biomolecule. A terminal end or any internal portion of a biomolecule can bind or attach to a polymeric particle. A polymeric particle can bind or attach to a biomolecule using linking chemistries. A linking chemistry includes covalent or non-covalent bonds, including an ionic bond, hydrogen bond, affinity bond, dipole-dipole bond, van der Waals bond, and hydrophobic bond. A linking chemistry includes affinity between binding partners, for example between: an avidin moiety and a biotin moiety; an antigenic epitope and an antibody or immunologically reactive fragment thereof; an antibody and a hapten; a digoxigen moiety and an anti-digoxigen antibody; a fluorescein moiety and an anti-fluorescein antibody; an operator and a repressor; a nuclease and a nucleotide; a lectin and a polysaccharide; a steroid and a steroid-binding protein; an active compound and an active compound receptor; a hormone and a hormone receptor; an enzyme and a substrate; an immunoglobulin and protein A; or an oligonucleotide or polynucleotide and its corresponding complement.

In an example, the polymeric particle can be utilized in a system with a surface. The system comprises one or more polymeric particles on a surface. A surface can be a solid surface. A surface can include planar, concave, or convex surfaces, or any combination thereof. A surface can comprise texture or features, including etching, cavitation or bumps. A surface can lack any texture or features. A surface can include the inner walls of a capillary, channel, groove, well or reservoir. A surface can be a mesh. A surface can be porous, semi-porous or non-porous. A surface can be a filter or gel. A surface can include the top of a pin (e.g., pin arrays). The surface may be made from materials such as glass, borosilicate glass, silica, quartz, fused quartz, mica, polyacrylamide, plastic polystyrene, polycarbonate, polymethacrylate (PMA), polymethyl methacrylate (PMMA), polydimethylsiloxane (PDMS), silicon, germanium, graphite, ceramics, silicon, semiconductor, high refractive index dielectrics, crystals, gels, polymers, or films (e.g., films of gold, silver, aluminum, or diamond). A surface can include a solid substrate having a metal film or metal coat. A surface can be optically transparent, minimally reflective, minimally absorptive, or exhibit low fluorescence.

A plurality of polymeric particles can be arranged in a random or ordered array on a surface, or a combination of random and ordered arrays. Ordered arrays include rectilinear and hexagonal patterns. A surface can include a plurality of sites arranged in a random or ordered array, or a combination of both. One or more polymeric particles can be located at one site, some sites or all sites. Some sites can have one polymeric particle and other sites can have multiple polymeric particles. At least one site can lack a polymeric particle. In an array, at least two polymeric particles can contact each other, or have no contact between polymeric particles.

Figure 2:
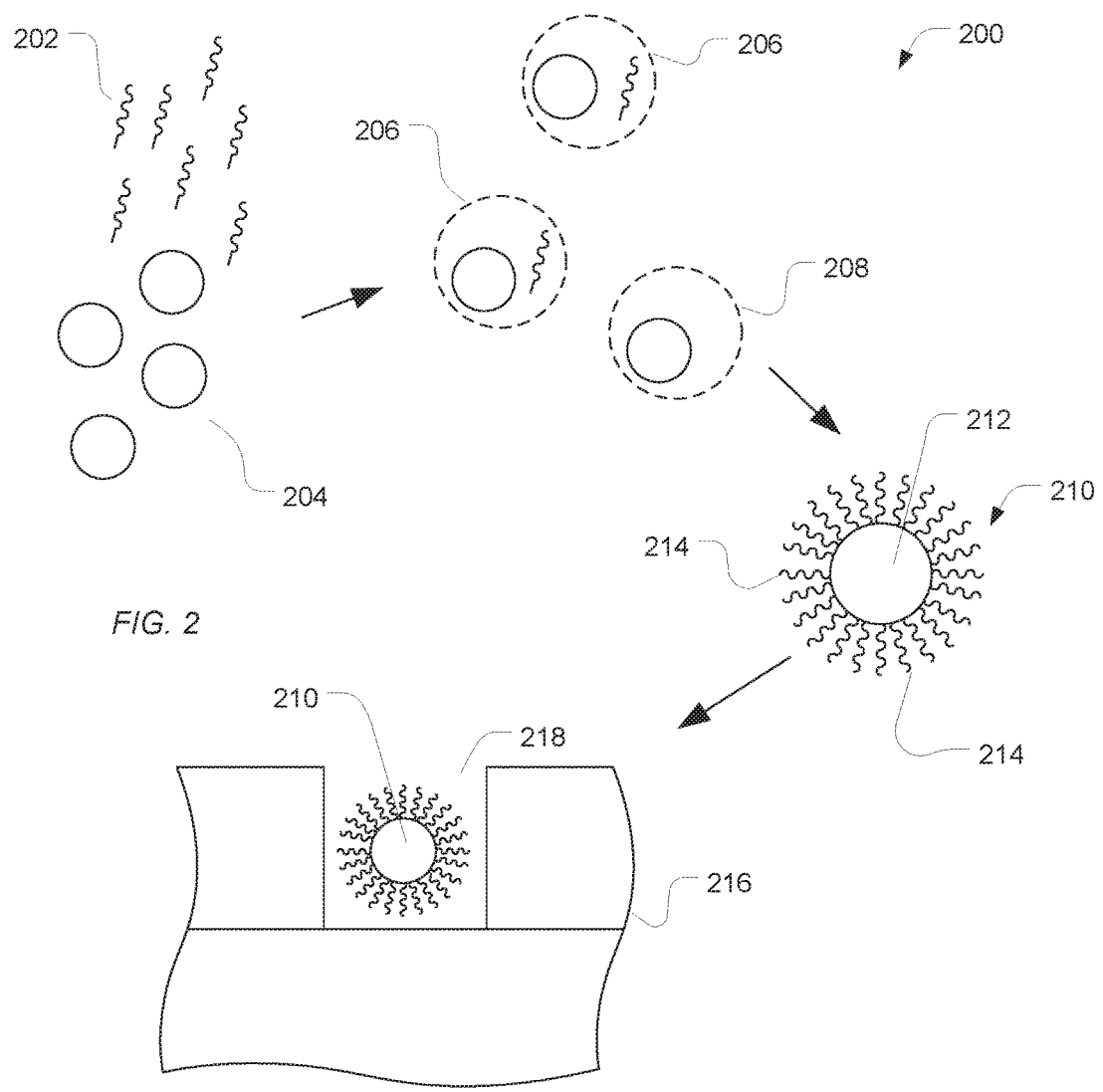
FIG. 2 includes an illustration of an exemplary sequencing method utilizing polymeric particles.

As illustrated in FIG. 2, a plurality of polymeric particles 204 can be placed in a solution along with a plurality of polynucleotides 202. The plurality of particles 204 can be activated or otherwise prepared to bind with the polynucleotides 202. For example, the particles 204 can include an oligonucleotide complementary to a portion of a polynucleotide of the plurality of polynucleotides 202.

In a particular embodiment, the hydrophilic particles and polynucleotides are subjected to polymerase chain reaction (PCR) amplification. For example, dispersed phase droplets 206 or 208 are formed as part of an emulsion and can include a hydrophilic particle or a polynucleotide. In an example, the polynucleotides 202 and the hydrophilic particles 204 are provided in low concentrations and ratios relative to each other such that a single polynucleotide 202 is likely to reside within the same dispersed phase droplets as a single hydrophilic particle 204. Other droplets, such as a droplet 208, can include a single hydrophilic particle and no polynucleotide. Each droplet 206 or 208 can include enzymes, nucleotides, salts or other components sufficient to facilitate duplication of the polynucleotide. Alternatively, amplification techniques, such as recombinase polymerase amplification (RPA) with or without emulsion, can be used.

In a particular embodiment, an enzyme such as a polymerase is present, bound to, or is in close proximity to the hydrophilic particle or hydrogel particle of the dispersed phase droplet. In an example, a polymerase is present in the dispersed phase droplet to facilitate duplication of the polynucleotide. A variety of nucleic acid polymerase may be used in the methods described herein. In an exemplary embodiment, the polymerase can include an enzyme, fragment or subunit thereof, which can catalyze duplication of the polynucleotide. In another embodiment, the polymerase can be a naturally-occurring polymerase, recombinant polymerase, mutant polymerase, variant polymerase, fusion or otherwise engineered polymerase, chemically modified polymerase, synthetic molecules, or analog, derivative or fragment thereof.

In an embodiment, the polymerase can be any Family A DNA polymerase (also known as pol I family) or any Family B DNA polymerase. In embodiments, the DNA polymerase can be a recombinant form capable of duplicating polynucleotides with superior accuracy and yield as compared to a non-recombinant DNA polymerase. For example, the polymerase can include a high-fidelity polymerase or thermostable polymerase. In embodiments, conditions for duplication of polynucleotides can include 'Hot Start' conditions, for example Hot Start polymerases, such as Amplitaq Gold® DNA polymerase (Applied Biosciences) or KOD Hot Start DNA polymerase (EMD Biosciences). Typically, a 'Hot Start' polymerase includes a thermostable polymerase and one or more antibodies that inhibit the DNA polymerase and 3'-5' exonuclease activities at ambient temperature.

In embodiments, the polymerase can be an enzyme such as Taq polymerase (from *Thermus aquaticus*), Tfi polymerase (from *Thermus filiformis*), Bst polymerase (from *Bacillus stearothermophilus*), Pfu polymerase (from *Pyrococcus furiosus*), Tth polymerase (from *Thermus thermophilus*), Pow polymerase (from *Pyrococcus woesei*), Tli polymerase (from *Thermococcus litoralis*), Ultima polymerase (from *Thermotoga maritima*), KOD polymerase (from *Thermococcus kodakaraensis*), Pol I and II polymerases (from *Pyrococcus abyssi*) and Pab (from *Pyrococcus abyssi*).

In embodiments, the polymerase can be a recombinant form of *Thermococcus kodakaraensis*. In embodiments, the polymerase can be a KOD or KOD-like DNA polymerase such as KOD polymerase (EMD Biosciences), KOD "Hot Start" polymerase (EMD Biosciences), KOD Xtreme Hot Start DNA Polymerase (EMD Biosciences), KOD XL DNA polymerase (EMD Biosciences), Platinum® Taq DNA Polymerase (Invitrogen), Platinum® Taq DNA Polymerase High Fidelity (Invitrogen), Platinum® Pfx (Invitrogen), Accuprime™ Pfx (Invitrogen), Accuprime™ Taq DNA Polymerase High Fidelity (Invitrogen) or Amplitaq Gold® DNA Polymerase (Applied Biosystems). In embodiments, the polymerase can be a DNA polymerase containing analogous mutations to those polymerases discussed herein.

In embodiments, duplication of the polynucleotide can include modulating the duplication conditions. Modulating can optionally include: increasing or decreasing the polymerase concentration; increasing or decreasing the nucleotide concentration; increasing or decreasing a cation concentration; increasing or decreasing a reaction temperature, time or pH, or the like. The modulating can include increasing or decreasing the rate of the reaction, increasing or decreasing the yield of product of the reaction, or the like. In embodiments, duplication can be performed in the presence of appropriate buffers or nucleotides (including nucleotide analogs or biotinylated nucleotides).

In particular, the polynucleotide to be amplified can be captured by the polymeric particle. Exemplary methods for capturing nucleic acid can include: hybridizing a polynucleotide to an oligonucleotide that is attached to a polymeric particle. In embodiments, methods for capturing nucleic acids comprise: (a) providing a polymeric particle attached to a single-stranded oligonucleotide (e.g., a capture oligonucleotide); (b) providing a single-stranded polynucleotide; and (c) hybridizing the single-stranded oligonucleotide to the single-stranded polynucleotides, thereby capturing the single-stranded polynucleotide to the polymeric particle. In embodiments, each of the polymeric particles can be attached with a plurality of single-stranded oligonucleotides (e.g., capture oligonucleotides). In embodiments, step (c) can be conducted with a plurality of single-stranded polynucleotides. In embodiments, at least a portion of the single-stranded oligonucleotide comprises a nucleotide sequence that is complementary (or partially complementary) to at least a portion of the single-stranded polynucleotide.

In an example, the method further includes amplifying the polynucleotide into a plurality of polynucleotides and attaching at least a portion of the plurality of polynucleotides to the hydrophilic particle, thereby generating a hydrophilic particle including a plurality of attached polynucleotides. Alternatively, the method can further include amplifying the polynucleotide into a plurality of complementary polynucleotides by extending the oligonucleotide, thereby generating a hydrogel particle including a plurality of attached polynucleotides.

In embodiments, methods for nucleotide incorporation comprise: conducting a nucleotide polymerization reaction on a polynucleotide that is hybridized to an oligonucleotide that is attached to a polymeric particle. In embodiments, methods for nucleotide incorporation comprise: (a) providing a polymeric particle attached to a single-stranded oligonucleotide (e.g., a primer oligonucleotide); (b) providing a single-stranded template polynucleotide; (c) hybridizing the single-stranded oligonucleotide to the single-stranded template polynucleotide; and (d) contacting the single-stranded template polynucleotide with a polymerase and at least one nucleotide under conditions suitable for the polymerase to catalyze polymerization of at least one nucleotide onto the single-stranded oligonucleotide, thereby conducting nucleotide incorporation. In embodiments, each of the polymeric particles can be attached with a plurality of single-stranded oligonucleotides (e.g., capture oligonucleotides). In embodiments, steps (b), (c) or (d) can be conducted with a plurality of single-stranded polynucleotides. In embodiments, at least a portion of the single-stranded oligonucleotide comprises a nucleotide sequence that is complementary (or partially complementary) to at least a portion of the single-stranded polynucleotide. In embodiments, a system comprises a single-stranded polynucleotide hybridized to a single-stranded oligonucleotide which is attached to a polymeric particle, wherein at least one nucleotide is polymerized onto the end of the single-stranded oligonucleotide.

In embodiments, methods for primer extension comprise: conducting a primer extension reaction on a polynucleotide that is hybridized to an oligonucleotide that is attached to a polymeric particle. In embodiments, methods for nucleic acid primer extension comprise: (a) providing a polymeric particle attached to a single-stranded oligonucleotide (e.g., a primer oligonucleotide); (b) providing a single-stranded template polynucleotide; (c) hybridizing the single-stranded oligonucleotide to the single-stranded template polynucleotide; and (d) contacting the single-stranded template polynucleotide with a polymerase and at least one nucleotide under conditions suitable for the polymerase to catalyze polymerization of at least one nucleotide onto the single-stranded oligonucleotide, thereby extending the primer. In embodiments, each of the polymeric particles can be attached with a plurality of single-stranded oligonucleotides (e.g., capture oligonucleotides). In embodiments, step (b), (c) or (d) can be conducted with a plurality of single-stranded polynucleotides. In embodiments, at least a portion of the single-stranded oligonucleotide comprises a nucleotide sequence that is complementary (or partially complementary) to at least a portion of the single-stranded polynucleotide. In embodiments, a system comprises a single-stranded polynucleotide hybridized to a single-stranded oligonucleotide which is attached to a polymeric particle, wherein the single-stranded oligonucleotide is extended with one or more nucleotides.

In embodiments, methods for nucleic acid amplification comprise: conducting a primer extension reaction on a polynucleotide that is hybridized to an oligonucleotide which is attached to a polymeric particle. In embodiments, methods for nucleic acid amplification comprise: (a) providing a polymeric particle attached to a single-stranded oligonucleotide (e.g., a primer oligonucleotide); (b) providing a single-stranded template polynucleotide; (c) hybridizing the single-stranded oligonucleotide to the single-stranded template polynucleotide; (d) contacting the single-stranded template polynucleotide with a polymerase and at least one nucleotide under conditions suitable for the polymerase to catalyze polymerization of at least one nucleotide onto the single-stranded oligonucleotide so as to generate an extended single-stranded oligonucleotide. In embodiments, the method further comprises: (e) removing (e.g., denaturing) the single-stranded template polynucleotide from the extended single-stranded oligonucleotide so that the single-stranded oligonucleotide remains attached to the polymeric particle; (f) hybridizing the remaining single-stranded oligonucleotide to a second single-stranded template polynucleotide; and (g) contacting the second single-stranded template polynucleotide with a second polymerase and a second at least one nucleotide, under conditions suitable for the second polymerase to catalyze polymerization of the second at least one nucleotide onto the single-stranded oligonucleotide so as to generate a subsequent extended single-stranded oligonucleotide. In embodiments, steps (e), (f) and (g) can be repeated at least once. In embodiments, the polymerase and the second polymerase comprise a thermostable polymerase. In embodiments, the conditions suitable for nucleotide polymerization include conducting the nucleotide polymerization steps (e.g., steps (d) or (g)) at an elevated temperature. In embodiments, the conditions suitable for nucleotide polymerization include conducting the nucleotide polymerization step (e.g., steps (d) or (g)) at alternating temperatures (e.g., an elevated temperature and a relatively lower temperature). In embodiments, the alternating temperature ranges from 60-95° C. In embodiments, the temperature cycles can be about 10 seconds to about 5 minutes, or about 10 minutes, or about 15 minutes, or longer. In embodiments, methods for nucleic acid amplification can generate one or more polymeric particles each attached to a plurality of template polynucleotides comprising sequences that are complementary to the single-stranded template polynucleotide or to the second single-stranded template polynucleotide. In embodiments, each of the polymeric particles can be attached with a plurality of single-stranded oligonucleotides (e.g., capture oligonucleotides). In embodiments, step (b), (c), (d), (e), (f) or (g) can be conducted with a plurality of single-stranded polynucleotides. In embodiments, at least a portion of the single-stranded oligonucleotide comprises a nucleotide sequence that is complementary (or partially complementary) to at least a portion of the single-stranded polynucleotide. In embodiments, methods for nucleic acid amplification (as described above) can be conducted in an aqueous phase solution in an oil phase (e.g., dispersed phase droplet).

Following PCR, particles are formed, such as particle 210, which can include the hydrophilic particle 212 and a plurality of copies 214 of the polynucleotide. While the polynucleotides 214 are illustrated as being on a surface of the particle 210, the polynucleotides can extend within the particle 210. Hydrogel and hydrophilic particles having a low concentration of polymer relative to water can include polynucleotide segments on the interior of and throughout the particle 210 or polynucleotides can reside in pores and other openings. In particular, the particle 210 can permit diffusion of enzymes, nucleotides, primers and reaction products used to monitor the reaction. A high number of polynucleotides per particle produces a better signal.

In embodiments, polymeric particles from an emulsion-breaking procedure can be collected and washed in preparation for sequencing. Collection can be conducted by contacting biotin moieties (e.g., linked to amplified polynucleotide templates which are attached to the polymeric particles) with avidin moieties, and separation away from polymeric particles lacking biotinylated templates. Collected polymeric particles that carry double-stranded template polynucleotides can be denatured to yield single-stranded template polynucleotides for sequencing. Denaturation steps can include treatment with base (e.g., NaOH), formamide, or pyrrolidone.

In an exemplary embodiment, the particle 210 can be utilized in a sequencing device. For example, a sequencing device 216 can include an array of wells 218. A particle 210 can be placed within a well 218.

In an example, a primer can be added to the wells 218 or the particle 210 can be pre-exposed to the primer prior to placement in the well 218. In particular, the particle 210 can include bound primer. The primer and polynucleotide form a nucleic acid duplex including the polynucleotide (e.g., a template nucleic acid) hybridized to the primer. The nucleic acid duplex is an at least partially double-stranded polynucleotide. Enzymes and nucleotides can be provided to the well 218 to facilitate detectible reactions, such as nucleotide incorporation.

Sequencing can be performed by detecting nucleotide addition. Nucleotide addition can be detected using methods such as fluorescent emission methods or ion detection methods. For example, a set of fluorescently labeled nucleotides can be provided to the system 216 and can migrate to the well 218. Excitation energy can be also provided to the well 218. When a nucleotide is captured by a polymerase and added to the end of an extending primer, a label of the nucleotide can fluoresce, indicating which type of nucleotide is added.

In an alternative example, solutions including a single type of nucleotide can be fed sequentially. In response to nucleotide addition, the pH within the local environment of the well 218 can change. Such a change in pH can be detected by ion sensitive field effect transistors (ISFET). As such, a change in pH can be used to generate a signal indicating the order of nucleotides complementary to the polynucleotide of the particle 210.

In particular, a sequencing system can include a well, or a plurality of wells, disposed over a sensor pad of an ionic sensor, such as a field effect transistor (FET). In embodiments, a system includes one or more polymeric particles loaded into a well which is disposed over a sensor pad of an ionic sensor (e.g., FET), or one or more polymeric particles loaded into a plurality of wells which are disposed over sensor pads of ionic sensors (e.g., FET). In embodiments, an FET can be a chemFET or an ISFET. A "chemFET" or chemical field-effect transistor, includes a type of field effect transistor that acts as a chemical sensor. The chemFET has the structural analog of a MOSFET transistor, where the charge on the gate electrode is applied by a chemical process. An "ISFET" or ion-sensitive field-effect transistor, can be used for measuring ion concentrations in solution; when the ion concentration (such as H+) changes, the current through the transistor changes accordingly.

In embodiments, the FET may be a FET array. As used herein, an "array" is a planar arrangement of elements such as sensors or wells. The array may be one or two dimensional. A one dimensional array can be an array having one column (or row) of elements in the first dimension and a plurality of columns (or rows) in the second dimension. The number of columns (or rows) in the first and second dimensions may or may not be the same. The FET or array can comprise $10^2$, $10^3$, $10^4$, $10^5$, $10^6$, $10^7$ or more FETs.

In embodiments, one or more microfluidic structures can be fabricated above the FET sensor array to provide for containment or confinement of a biological or chemical reaction. For example, in one implementation, the microfluidic structure(s) can be configured as one or more wells (or microwells, or reaction chambers, or reaction wells, as the terms are used interchangeably herein) disposed above one or more sensors of the array, such that the one or more sensors over which a given well is disposed detect and measure analyte presence, level, or concentration in the given well. In embodiments, there can be a 1:1 correspondence of FET sensors and reaction wells.

Returning to FIG. 2, in another example, a well 218 of the array of wells can be operatively connected to measuring devices. For example, for fluorescent emission methods, a well 218 can be operatively coupled to a light detection device. In the case of ionic detection, the lower surface of the well 218 may be disposed over a sensor pad of an ionic sensor, such as a field effect transistor.

Exemplary systems involving sequencing via detection of ionic byproducts of nucleotide incorporation are the Ion Torrent PGM™, Proton™, or S5™ sequencers (Life Technologies), which are ion-based sequencing systems that sequences nucleic acid templates by detecting hydrogen ions produced as a byproduct of nucleotide incorporation. Typically, hydrogen ions are released as byproducts of nucleotide incorporations occurring during template-dependent nucleic acid synthesis by a polymerase. The Ion Torrent PGM™, Proton™, or S5™ sequencers detect the nucleotide incorporations by detecting the hydrogen ion byproducts of the nucleotide incorporations. The Ion Torrent PGM™, Proton™, or S5™ sequencers can include a plurality of template polynucleotides to be sequenced, each template disposed within a respective sequencing reaction well in an array. The wells of the array can each be coupled to at least one ion sensor that can detect the release of H+ ions or changes in solution pH produced as a byproduct of nucleotide incorporation. The ion sensor comprises a field effect transistor (FET) coupled to an ion-sensitive detection layer that can sense the presence of H+ ions or changes in solution pH. The ion sensor can provide output signals indicative of nucleotide incorporation which can be represented as voltage changes whose magnitude correlates with the H+ ion concentration in a respective well or reaction chamber. Different nucleotide types can be flowed serially into the reaction chamber, and can be incorporated by the polymerase into an extending primer (or polymerization site) in an order determined by the sequence of the template. Each nucleotide incorporation can be accompanied by the release of H+ ions in the reaction well, along with a concomitant change in the localized pH. The release of H+ ions can be registered by the FET of the sensor, which produces signals indicating the occurrence of the nucleotide incorporation. Nucleotides that are not incorporated during a particular nucleotide flow may not produce signals. The amplitude of the signals from the FET can also be correlated with the number of nucleotides of a particular type incorporated into the extending nucleic acid molecule thereby permitting homopolymer regions to be resolved. Thus, during a run of the sequencer multiple nucleotide flows into the reaction chamber along with incorporation monitoring across a multiplicity of wells or reaction chambers can permit the instrument to resolve the sequence of many nucleic acid templates simultaneously.

Embodiments of the polymeric particles exhibit technical advantages when used in sequencing techniques, particularly ion-based sequencing techniques. In particular, embodiments of the polymeric particles are non-buffering or enhance read lengths or accuracy.

In a further example, the polymeric particles can exhibit greater uniformity and lower CV without filtering than particles made through other methods. For example, the above methods can directly from the polymer particles without applying any kind of selection process such as filtering or using a centrifuge. In particular, emulsion polymerization can be used to produce particles suitable for seed particles. Typically seed particles are non-crosslinked to be able to adsorb the promoter molecule.

Further, embodiments of the present method provide for size control based on the size of the seed particle. Additionally, embodiments of particles made by such methods provide an increase in conjugation, such as a 60% to 80% increase in conjugation, over other methods.

EXAMPLES

Example 1

Synthesis

To an ice-cold suspension of 24.87 g (127.1 mmol) γ-aminobutyric acid t-butyl ester hydrochloride in 155 mL dichloromethane is added a solution of 44.18 g (317.7 mmol) potassium carbonate in 125 mL water. The reaction mixture is stirred on ice bath for 15 min, followed by the addition of 16 mL (0.19 mol) acryloyl chloride over a 10 min period. After 30 min stirring on ice bath, the mixture is extracted with 250 mL dichloromethane. The organic phase is washed with water, 3 × 250 mL, and saturated aqueous sodium chloride solution, 250 mL. Removal of solvent under reduced pressure affords the crude product in quantitative yield.

Example 2

Purification

Approximately 27 g crude product is purified by way of dry-column vacuum chromatography (DCVC), using 400 g silica as adsorbent. Fractions of 300 mL size is eluted, employing a gradient of methanol in dichloromethane (0-4%). The fractions containing pure product is pooled, and subsequent removal of solvent under reduced pressure gives 22.68 g product (84% overall yield) as a colorless oil which solidified upon storage.

Example 3

Purification

Crude product (0.57 g) is purified on a small DCVC-column. Fractions of 50 mL size are eluted, employing a gradient of ethyl acetate in hexane (5-50%). The fraction containing pure product is pooled, and subsequent removal of solvent under reduced pressure gives 0.46 g product (81% recovery).

Example 4

Purification

Crude product (39.6 g) is dissolved in 150 mL ethyl acetate. Heptane (600 mL) is added, and the stirred solution is slowly cooled down −40° C., whereupon a colorless precipitate is formed. The precipitate is isolated on a cold glass sinter funnel, washed with cold pentane (2×200 mL), and dried to a constant mass of 29.7 g (75% recovery) in a vacuum desiccator. 1H NMR (CDCl3, 400 MHz) 6.26 (d, 1H), 6.07 (dd, 1H), 5.98 (s, 1H), 5.62 (d, 1H), 3.37 (q, 2H), 2.30 (t, 2H), 1.84 (p, 2H), 1.44 (s, 9H).

Example 5

A silyl protected acrylamide monomer, (N-(2-((tert-butyldimethylsilyl)oxy)ethyl)acrylamide) (tBDMS-HEAM), and an ester group bearing acrylamide, t-butyl 4-acrylamidobutanoate, are polymerized with N,N'-(ethane-1,2-diyl) bis(N-(2-(tert-butyldimethylsilyloxy)ethyl)acrylamide) (tBDMS-EBHEAM) crosslinker in a dispersed phase formed from polystyrene particles and is deprotected to form a hydrogel particle.

An emulsion is prepared by first dissolving 1.3808 g SDS in 230.00 g water and then adding 11.51 g acetone and 23.00 g bis(2-ethylhexyl) adipate (DOA). The emulsion is mixed by ultraturax for 3 minutes, and further homogenized for 5 minutes in a high pressure Gauline APV-100 homogenizer at 400 Bar.

An amount of 37.15 g of this emulsion is added to 13.91 g of seed particles (seed diameter 0.539 µm, 15.41 weight % solids) in a flask. The mixture is shaken at 40° C. for 40h in a shaking bath for activation.

An SDS-borax solution is prepared by dissolving 0.65 g SDS and 1.36 g borax to 341.11 g water.

A monomer emulsion is formed from 48.20 g 2-phenethyl acetate, 0.0402 g 2,2'-azobis-(2-methylbutyronitrile) (AMBN), 8.70 g tBDMS-HEAM, 1.7448 g tBDMS-EBHEAM, 0.0411 g t-butyl 4-acrylamidobutanoate and 328.38 g SDS-borax solution, mixed by a high speed mixer (Ystral D-79282) for 3 minutes, and further homogenized for 4 minutes by a high pressure homogenizer at 400 bar.

In a jacket reactor, 14.18 g of a water dispersion of activated seed particles is mixed with 337.0 g of the monomer emulsion. The mixture is stirred and heated at 40° C. for 2h. The mixture is further stirred and heated at 40° C. for another hour while argon gas (150-200 ml/min) is bubbled through the mixture. The amount of $O_2$ in the emulsion at the end of purging is measured to be 0 ppb. The argon flow is stopped, heating and stirring continues for 10 hours at 70° C.

The beads are filtered and the supernatant is removed after centrifugation. The resulting beads are mixed with water, and 35.77 g 1M aqueous $H_2SO_4$ solution is added to the bead dispersion, the dispersion is shaken at 60° C. in a water bath for 90 min and cooled to room temperature. The pH of the gel dispersion is adjusted to 7.7 with NaOH and THF is added. The organic phase is discarded and the hydrolyzed beads are cleaned by centrifugation three times in water followed by crossflow filtration in NMP.

In another example, hydrolysis can be done for 3 hours at 60° C. in a water bath or for 18 hours at 40° C. in a water bath In another example, seed particles can have an average diameter of at least 0.050 µm. In another example, seed particles can have an average diameter of at max 10 µm, more typically between 90 nm and 330 nm.

In a first aspect, a compound has the formula (I) above, wherein R1 is an alkyl group having between 3 and 10 carbons or is a polyether group having between 1 and 10 ether units, wherein R2 is a linear or branched alkyl group having between 3 and 8 carbons or a silyl group, and wherein R3 is hydrogen or an alkyl group having between 1 and 6 carbons.

In an example of the first aspect, R1 is an alkyl group having between 3 and 6 carbons. For example, R1 is an alkyl group having between 3 and 5 carbons.

In another example of the first aspect and above examples, R1 is a polyether group having 2 to 6 units.

In a further example of the first aspect and above examples, the units of R1 include ethylene oxide or propylene oxide units.

In an additional example of the first aspect and above examples, R2 is a branched alkyl group. For example, R2 is a branched alkyl group having between 3 and 5 carbons. In an example, R2 is a branched alkyl group having 4 carbons.

In another example of the first aspect and above examples, R3 is hydrogen.

In a further example of the first aspect and above examples, R3 is a methyl or ethyl group.

In a second aspect, a method of synthesizing a monomer includes reacting an amino alkanoate alkyl ester hydrochloride with acryloyl chloride at a temperature in a range of −10° C. to 10° C. to form an alkyl ester of acrylamide alkanoic acid, wherein the alkanoate group of the amino alkanoate alkyl ester includes 3 to 10 carbons and the alkyl ester of the amino alkanoate alkyl ester has 3 to 8 carbons; and extracting the alkyl ester of acrylamide alkanoic acid using a solvent.

In an example of the second aspect, the alkanoate group has 3 to 6 carbons. For example, the alkanoate group has 3 to 5 carbons.

In another example of the second aspect and above examples, the alkyl ester includes a branched ester.

In a further example of the second aspect and above examples, the alkyl ester includes 3 to 5 carbons. For example, the alkyl ester includes 4 carbons.

In a third aspect, a population of particles having a coefficient of variance of not greater than 5% and comprising a polymer derived from polymerization of a compound of the formula (I) above, wherein R1 is an alkyl group having between 3 and 10 carbons or is a polyether group having between 1 and 10 ether units, wherein R2 is a linear or branched alkyl group having between 3 and 8 carbons or a silyl group, and wherein R3 is hydrogen or an alkyl group having between 1 and 6 carbons; and wherein after removal of R2, the particle absorbs at least 300 wt % and not greater than $10^6$% water based on the weight of the polymer when exposed to water.

In an example of the third aspect, the polymer is further derived from the polymerization of protected acrylamide or protected hydroxyalkyl acrylamide with the compound.

In another example of the third aspect and above examples, the polymer is further derived from the polymerization of a crosslinker with the compound. For example, the crosslinker comprises a diacrylamide. In an example, diacrylamide includes N,N'-(ethane-1,2-diyl)bis(2-hydroxyl ethyl)acrylamide, N,N'-(2-hydroxypropane-1,3-diyediacrylamide, a protected derivative thereof, or a combination thereof.

In a further example of the third aspect and above examples, R1 is an alkyl group having between 3 and 6 carbons. For example, R1 is an alkyl group having between 3 and 5 carbons.

In an additional example of the third aspect and above examples, R1 is a polyether group having 2 to 6 units.

In another example of the third aspect and above examples, the units of R1 include ethylene oxide or propylene oxide units.

In a further example of the third aspect and above examples, R2 is a branched alkyl group. For example, R2 is a branched alkyl group having between 3 and 5 carbons. In an example, R2 is a branched alkyl group having 4 carbons.

In an additional example of the third aspect and above examples, R3 is hydrogen.

In another example of the third aspect and above examples, R3 is a methyl or ethyl group.

In a further example of the third aspect and above examples, the particle absorbs at least 1000 wt % water based on the weight of the polymer when exposed to water.

In an additional example of the third aspect and above examples, the particle has a particle size of not greater than 100 micrometers.

In a fourth aspect, a method of forming a particle includes in a disperse phase within an aqueous suspension, polymerizing a plurality of mer units having the formula (I) above, wherein R1 is an alkyl group having between 3 and 10 carbons or is a polyether group having between 1 and 10 ether units, wherein R2 is a linear or branched alkyl group having between 3 and 8 carbons or a silyl group, and wherein R3 is hydrogen or an alkyl group having between 1 and 6 carbons; thereby forming a polymeric particle including a plurality of the hydrophobic protection groups; and converting the polymeric particle to a hydrophilic particle.

In an example of the fourth aspect, the hydrophilic particle is a hydrogel particle.

In another example of the fourth aspect and the above examples, the disperse phase further includes a hydrophilic monomer, the hydrophilic monomer including an acrylamide monomer.

In an additional example of the fourth aspect and the above examples, the dispersed phase further includes a diacrylamide crosslinker having a hydrophobic protection group.

In a further example of the fourth aspect and the above examples, converting the polymeric particle includes removing at least a portion of the plurality of the $R_2$ groups from the polymeric particle. For example, removing at least a portion of the plurality of the $R_2$ groups includes acid cleaving at least a portion of the plurality of the $R_2$ groups from the polymeric particle.

In another example of the fourth aspect and the above examples, the method further includes promoting a seed particle in the aqueous suspension to form the dispersed phase. For example, the mass ratio of monomer: seed particles is in a range of 150:1 to 1:1. In another example, the seed particle includes a seed polymer. In a further example, the method further includes extracting the seed polymer after converting the polymeric particle. For example, the seed polymer is hydrophobic. In an example, the seed polymer includes a styrenic polymer, an acrylic polymer, an acrylamide, another vinyl polymer, or a combination thereof. For example, promoting the seed particle includes mixing a solvent and a promoting agent with the seed particle. In another example, the promoting agent includes dioctanoyl peroxide or dioctyladipate or polystyrene with molecular weight below 20 kD.

In an additional example of the fourth aspect and the above examples, the dispersed phase further includes acrylamide, hydroxyalkyl acrylamide, or a combination thereof, the acrylamide or hydroxyalkyl acrylamide polymerizing with the plurality of mer units.

In a further example of the fourth aspect and the above examples, polymerizing the plurality of mer units further includes mixing a crosslinker with the plurality of mer units.

In an additional example of the fourth aspect and the above examples, mixing the crosslinker includes mixing the crosslinker at a mass ratio of monomer:crosslinker in a range of 15:1 to 1:2. For example, the crosslinker is a divinyl crosslinker. In an example, the divinyl crosslinker includes a diacrylamide. For example, the diacrylamide includes N,N'-(ethane-1,2-diyl)bis(N-(2-((tert-butyldimethylsilyl)oxy)ethyl)acrylamide, N,N'-(2-hydroxypropane-1,3-diyl)diacrylamide, a protected derivative thereof, or a combination thereof. For example, the diacrylamide includes N,N'-(ethane-1,2-diyl)bis(N-(2-((tert-butyldimethylsilyl)oxy)ethyl)acrylamide, N,N'-(N-(2-((tert-butyldimethylsilyl)oxy)propane-1,3-diyediacrylamide, N,N'-(ethane-1,2-diyl)bis(N-(2-((triethylsilyl)oxy)ethyl)acrylamide, N,N'-(N-(2-((triethylsilyl)oxy)propane-1,3-diyl)diacrylamide, silyl-protected N-[2-(acryloylamino)-1,2-dihydroxyethyl]acrylamide such as N,N'(2,3-bis((triethylsilyl)oxy)butane-1,4-diyl)diacrylamide, or a combination thereof. In an example, the divinyl crosslinker includes ethyleneglycoldimethacrylate, divinylbenzene, hexamethylene bisacrylamide, trimethylolpropane trimethacrylate, or a combination thereof.

In another example of the fourth aspect and the above examples, polymerizing the plurality of mer units includes mixing a porogen in the disperse phase. For example, the porogen is an aromatic porogen. In an example, the aromatic porogen includes toluene, xylene, mesitylene, phenylenethyl acetate or ethylbenzoate.

In a further example of the fourth aspect and the above examples, the method further includes activating the hydrophilic particle. For example, activating includes applying a succinimidyl compound to the hydrophilic particle. In an example, the method further includes binding an oligonucleotide to the activated hydrogel polymer. In another example, binding includes nucleophilic substitution and the oligonucleotide is a nucleophile-terminated oligonucleotide. For example, a nucleophile of the nucleophile-terminated oligonucleotide is an amine group. In an additional example, the method further includes hybridizing a polynucleotide to the oligonucleotide. For example, the method further includes amplifying the polynucleotide into a plurality of polynucleotides and attaching at least a portion of the plurality of polynucleotides to the hydrogel particle, thereby generating a hydrogel particle including a plurality of attached polynucleotides. For example, the method further includes amplifying the polynucleotide into a plurality of complementary polynucleotides by extending the oligonucleotide, thereby generating a hydrogel particle including a plurality of attached polynucleotides.

In an additional example of the fourth aspect and the above examples, the hydrogel particle is one of a plurality of similarly formed hydrogel particles having an average particle size of at least 0.01 micrometers and not greater than 3 micrometer in water.

In another example of the fourth aspect and the above examples, the hydrogel particle is one of a plurality of similarly formed hydrogel particles having an average particle size in a range of 5 micrometers to 100 micrometers in water.

In a further example of the fourth aspect and the above examples, the polymeric particle has a positive log(p) value and, after converting the hydrophilic particle has a negative log(p) value.

The above described methods, systems, compounds, and polymer particles exhibit desirable technical advantages. Previous systems and methods utilized silane protected amine or hydroxyl functionalized acrylamides, which hydrolyze at a pH below 7. Unprotected carboxyl functionalized acrylamides can cause low pH, hydrolyzing other components and rendering them immiscible with the dispersed phase, leading to reduced bead formation. Even when buffered to pH 9, the carboxylic acid is a salt and does not dissolve in the oil phase and thus, is not polymerized into the particle. Accordingly, the above compounds, methods, and systems advantageously lead to improved bead formation.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:
1. A compound of the formula:

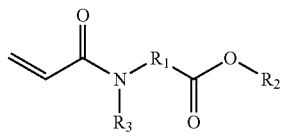

wherein $R_1$ is an alkyl group having between 3 and 10 carbons or is a polyether group having between 1 and 10 ether units, wherein $R_2$ is a linear or branched alkyl group having between 3 and 8 carbons or a silyl group, and wherein $R_3$ is hydrogen or an alkyl group having between 1 and 6 carbons.

2. The compound of claim 1, wherein $R_1$ is an alkyl group having between 3 and 6 carbons.

3. The compound of claim 2, wherein $R_1$ is an alkyl group having between 3 and 5 carbons.

4. The compound of claim 1, wherein $R_1$ is a polyether group having 2 to 6 units.

5. The compound of claim 1, wherein the units of $R_1$ include ethylene oxide or propylene oxide units.

6. The compound of claim 1, wherein $R_2$ is a branched alkyl group.

7. The compound of claim 6, wherein $R_2$ is a branched alkyl group having between 3 and 5 carbons.

8. The compound of claim 7, wherein $R_2$ is a branched alkyl group having 4 carbons.

9. The compound of claim 1, wherein $R_3$ is hydrogen.

10. The compound of claim 1, wherein $R_3$ is a methyl or ethyl group.

11. A population of particles having a coefficient of variance of not greater than 5% and comprising a polymer derived from polymerization of a compound of the formula:

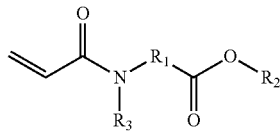

wherein $R_1$ is an alkyl group having between 3 and 10 carbons or is a polyether group having between 1 and 10 ether units, wherein $R_2$ is a linear or branched alkyl group having between 3 and 8 carbons or a silyl group, and wherein $R_3$ is hydrogen or an alkyl group having between 1 and 6 carbons; and wherein after removal of $R_2$, the particle absorbs at least 300 wt % and not greater than $10^6$ wt % water based on the weight of the polymer when exposed to water.

12. The population of particles of claim 11, wherein the polymer is further derived from the polymerization of protected acrylamide or protected hydroxyalkyl acrylamide with the compound.

13. The population of particles of claim 11, wherein the polymer is further derived from the polymerization of a crosslinker with the compound.

14. The population of particles of claim 13, wherein the crosslinker comprises a diacrylamide.

15. The population of particles of claim 14, wherein the diacrylamide includes N,N'-(ethane-1,2-diyl)bis(2-hydroxylethyl)acrylamide, N,N'-(2-hydroxypropane-1,3-diyl)diacrylamide, a protected derivative thereof, or a combination thereof.

16. The population of particles of claim 11, wherein $R_1$ is an alkyl group having between 3 and 6 carbons.

17. The population of particles of claim 16, wherein $R_1$ is an alkyl group having between 3 and 5 carbons.

18. The population of particles of claim 11, wherein $R_1$ is a polyether group having 2 to 6 units.

19. The population of particles of claim 11, wherein the units of $R_1$ include ethylene oxide or propylene oxide units.

20. The population of particles of claim 11, wherein $R_2$ is a branched alkyl group.

* * * * *